US007677201B1

(12) United States Patent
Eden

(10) Patent No.: US 7,677,201 B1
(45) Date of Patent: Mar. 16, 2010

(54) DISPOSABLE SANITARY SHIELD FOR KITTY LITTER CONTAINERS

(76) Inventor: Ralph Eden, 1061 Sandle Wood Ave., La Habra, CA (US) 90631

( * ) Notice: Subject to any disclaimer, the term of this patent is extended or adjusted under 35 U.S.C. 154(b) by 406 days.

(21) Appl. No.: 11/595,443

(22) Filed: Nov. 9, 2006

Related U.S. Application Data

(60) Provisional application No. 60/734,541, filed on Nov. 9, 2005.

(51) Int. Cl.
*A01K 1/035* (2006.01)
*G09F 3/00* (2006.01)
*B65D 25/00* (2006.01)

(52) U.S. Cl. .................. 119/165; 119/168; 40/312; 40/308; 206/767; 206/768

(58) Field of Classification Search ......... 119/165–170; 40/312, 308; 206/767–768
See application file for complete search history.

(56) References Cited

U.S. PATENT DOCUMENTS

| 1,448,767 | A | * | 3/1923 | Robbins | 40/307 |
| 1,765,484 | A | * | 6/1930 | Gray | 40/312 |
| 1,773,141 | A | * | 8/1930 | Hodgson | 119/165 |
| 1,859,523 | A | * | 5/1932 | Neely | 229/125.11 |
| 2,119,789 | A | * | 6/1938 | Krout | 206/767 |
| 2,209,657 | A | * | 7/1940 | Martin | 40/312 |
| 2,230,866 | A | * | 2/1941 | Krout | 206/767 |
| 3,233,588 | A | * | 2/1966 | Thomas | 119/166 |
| 3,827,401 | A | * | 8/1974 | Franzl | 119/169 |
| 4,690,272 | A | * | 9/1987 | Adams | 206/45.28 |
| 4,711,198 | A | * | 12/1987 | Mossbarger | 119/168 |
| 4,892,058 | A | * | 1/1990 | Clark | 119/161 |
| 4,986,218 | A | * | 1/1991 | Cassone | 119/169 |
| 5,080,046 | A | * | 1/1992 | Cassone | 119/168 |
| 5,329,879 | A | | 7/1994 | Walton | |
| 5,555,844 | A | | 9/1996 | Kolomeyer | |
| 5,727,499 | A | * | 3/1998 | Armington et al. | 119/168 |
| 6,079,363 | A | * | 6/2000 | MacLaine | 119/161 |
| 6,367,420 | B1 | | 4/2002 | Tomlinson | |
| 2007/0169707 | A1 | * | 7/2007 | van Zuilekom | 119/169 |

* cited by examiner

*Primary Examiner*—Rob Swiatek
*Assistant Examiner*—Kristen C Hayes

(57) ABSTRACT

A sanitary shield includes a body formed from liquid absorbing material. An uppermost section is monolithically formed with a bottom section wherein the uppermost section is pivotal along a fulcrum axis transverse to a longitudinal axis of the body. First, second and third edges define an outer periphery of the bottom section, and fourth, fifth and sixth edges define an outer periphery of the uppermost section. A bend line indentation extends along the fulcrum axis and defines a line of weakness about which the uppermost section is pivotal. The uppermost section is disposed above a top edge of the litter container, and the bottom section is partially submerged beneath the litter housed within the litter container. The litter remains positioned forwardly of the bottom section. A mechanism affixes the bottom section of the body to an inner surface of the litter container.

12 Claims, 5 Drawing Sheets

DISPOSABLE SANITARY SHIELD FOR KITTY LITTER CONTAINERS

CROSS REFERENCE TO RELATED APPLICATIONS

This application claims the benefit of U.S. Provisional Application No. 60/734,541, filed Nov. 9, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to sanitary shields and, more particularly, to a disposable sanitary shield employed with kitty litter containers for absorbing and deflecting cat spray into the litter, thereby preventing noxious residue from collecting on adjacent walls and floors.

2. Prior Art

Animals while using waste systems involving litter or granules, newspaper, corn, peas, sand or any material in which to urinate or defecate often scratch and displace this material out of the waste management box to the surrounding area. The spreading of ammoniated and fecal infested waste absorbent material from an animal waste box, as referred to above, is a common but undesirable occurrence which happens in millions of American homes as well as in the homes of many foreign countries.

One prior art example shows an anti-litter spreading and containment device for pet animals. It consists in a fence-like structure which substantially surrounds and sits atop almost the entire perimeter of the animal's waste collection container. Unfortunately, this prior art example requires extensive assembly and time, and is complicated to use. This example also includes a plethora of pieces which can become lost or damaged, thereby rendering the invention useless for its intended purpose. In addition, this prior art example does not disclose a means of restricting pet spray from exiting the confines of the litter container.

Another prior art example shows an apparatus for preventing litter from being scattered upon the floor outside the litter box and beyond, whether strewn by the cat during or after using the litter box, or by the owner when cleaning the litter box. The present invention comprises an enclosure having a front side, a left side, a right side and a base. The present invention is designed to encourage the cat to step out of a litter box and into a tracked litter receptacle for collecting tracked litter. The front side, or the left and/or right sides near the front side of the enclosure, has/have portal(s) allowing a cat to step into the enclosure. The present invention is further designed to corral not only litter tracked on the bottom of the cats paws, but litter tossed, flipped and spilled out of the litter box. Unfortunately, this example also does not address the problem of containing pet spray within the confines of a litter box. In addition, this example requires additional floor space for use, which may be inconvenient for a user to provide.

Accordingly, a need remains for a disposable sanitary shield employed with kitty litter containers in order to overcome the above-noted shortcomings. The present invention satisfies such a need by providing an apparatus that is convenient and easy to use, is lightweight and durable in design, and absorbs and deflects cat spray into the litter, thereby preventing noxious residue from collecting on adjacent walls and floors. The apparatus also effectively prevents litter from being displaced outside of the confines of the litter container. The apparatus ensures a clean and healthy environment for the animal as well as other household residents. The apparatus can be used by private households, veterinary clinics, pet boarding facilities and animal shelters. The present invention is simple, effective and inexpensive.

BRIEF SUMMARY OF THE INVENTION

In view of the foregoing background, it is therefore an object of the present invention to provide an apparatus for disposable sanitary shield employed with kitty litter containers. These and other objects, features, and advantages of the invention are provided by a disposable sanitary shield employed with kitty litter containers for absorbing and deflecting cat spray into the litter.

The apparatus includes a unitary and single body formed from liquid absorbing material, such as cardboard, wherein fluids effectively penetrate a surface thereof and become permanently impregnated therein. Such a body has an uppermost section and a bottom section monolithically formed therewith wherein the uppermost section is selectively pivotal along a fulcrum axis transversely defined to a longitudinal axis of the body. Such an uppermost section has a surface area less than a surface area of the bottom section. The body further has first, second and third edges effectively defining an outer periphery of the bottom section, and further has fourth, fifth and sixth edges effectively defining an outer periphery of the uppermost section.

The body further includes a bend line indentation advantageously extending along the fulcrum axis and thereby effectively defining a line of weakness about which the uppermost section is pivotal such that the uppermost section is conveniently offset downwardly towards the bottom section and towards an interior of the litter container. Such a line of weakness effectively defines a common shared edge of the bottom section and the uppermost section respectively. The line of weakness linearly extends from a connection point of the sixth and the first edges and advantageously spans across a face of the body and terminates at a connection point of the fourth and the third edges respectively such that the line of weakness conveniently runs parallel to the fifth edge and the second edge respectively.

The line of weakness has a longitudinal length equal to a longitudinal length of the second edge, and a longitudinal length greater than a longitudinal length of the fifth edge. The fourth and sixth edges advantageously converge upwardly and away from the line of weakness and terminate at opposed ends of the fifth edge such that the fifth edge has a longitudinal length less than a longitudinal length of the second edge.

The uppermost section is disposed above a top edge of the litter container for effectively preventing fluids and litter from being discharged over the top edge of the litter container. The bottom section is partially submerged beneath the litter housed within the litter container. The litter remains positioned forwardly of the bottom section such that the bottom section effectively absorbs fluids disposed above and below the litter.

The apparatus further includes a mechanism for removably affixing the bottom section of the body to an inner surface of the litter container such that the body provides an effective barrier for advantageously prohibiting discharge of fluids and litter from the litter container. The removable affixing mechanism includes a plurality of coextensively shaped adhesive layers directly mated with a rear surface of the bottom section. Such adhesive layers conveniently have rectilinear shapes contiguously extending parallel to the first and third edges such that the body conveniently remains statically adhered to the inner wall and thereby advantageously maintains the body at an upright position effectively defined parallel to the inner wall during operating conditions. Elongated protection layers are removably positioned over the adhesive layers wherein the protective layers effectively protect the adhesive layers from prematurely engaging fluids and debris prior to conjoining the body against the inner surface of the litter container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
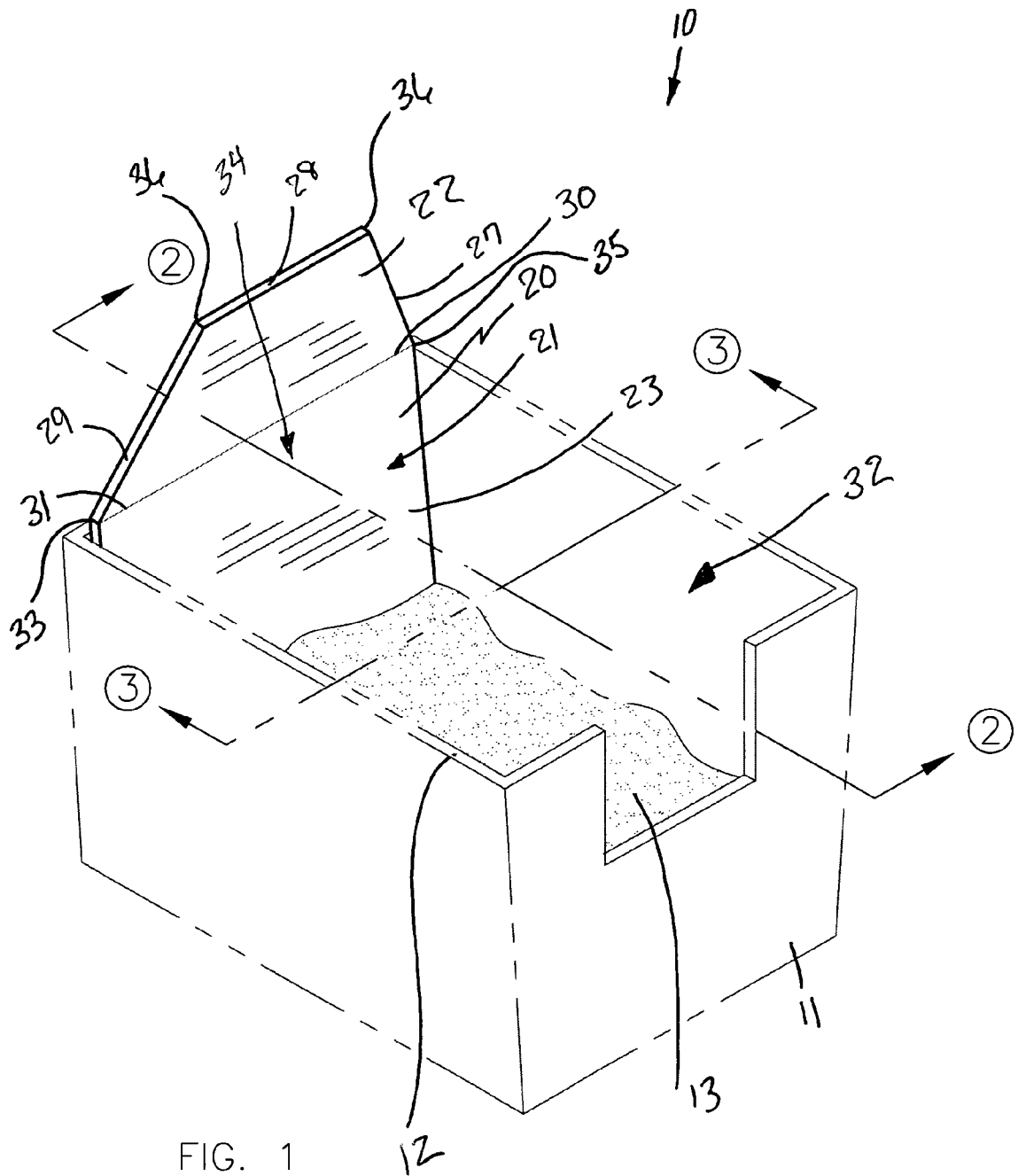
FIG. 1 is a perspective view of a disposable sanitary shield for kitty litter containers, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-5 by the reference numeral 10 and is intended to provide a disposable sanitary shield for kitty litter containers. It should be understood that the apparatus 10 may be used to provide a shield for many different types of containers and should not be limited in use to providing a shield for only those types of containers described herein.

Referring initially to FIGS. 1, 2, 3 and 5, the apparatus 10 includes a unitary and single body 20 formed from liquid absorbing material, such as cardboard for example, wherein fluids penetrate a surface 21 thereof and become permanently impregnated therein, which is essential for allowing nearby surfaces to remain clean and odor free. Of course, such a body 20 can be formed from a variety of suitable fluid absorbing materials such as sponge, fiber and cloth, for example, as is obvious to a person of ordinary skill in the art. The body 20 has an uppermost section 22 and a bottom section 23 monolithically formed therewith wherein the uppermost section 22 is selectively pivotal along a fulcrum axis transversely defined to a longitudinal axis of the body 20, which is critical for allowing an operator to angle the upper most section 22 at alternate angles for accommodating various sized animals and litter containers 11. Such an uppermost section 22 has a surface area less than a surface area of the bottom section 23. The body 20 further has first 24, second 25 and third 26 edges defining an outer periphery of the bottom section 23, and fourth 27, fifth 28 and sixth 29 edges defining an outer periphery of the uppermost section 22.

Figure 3:
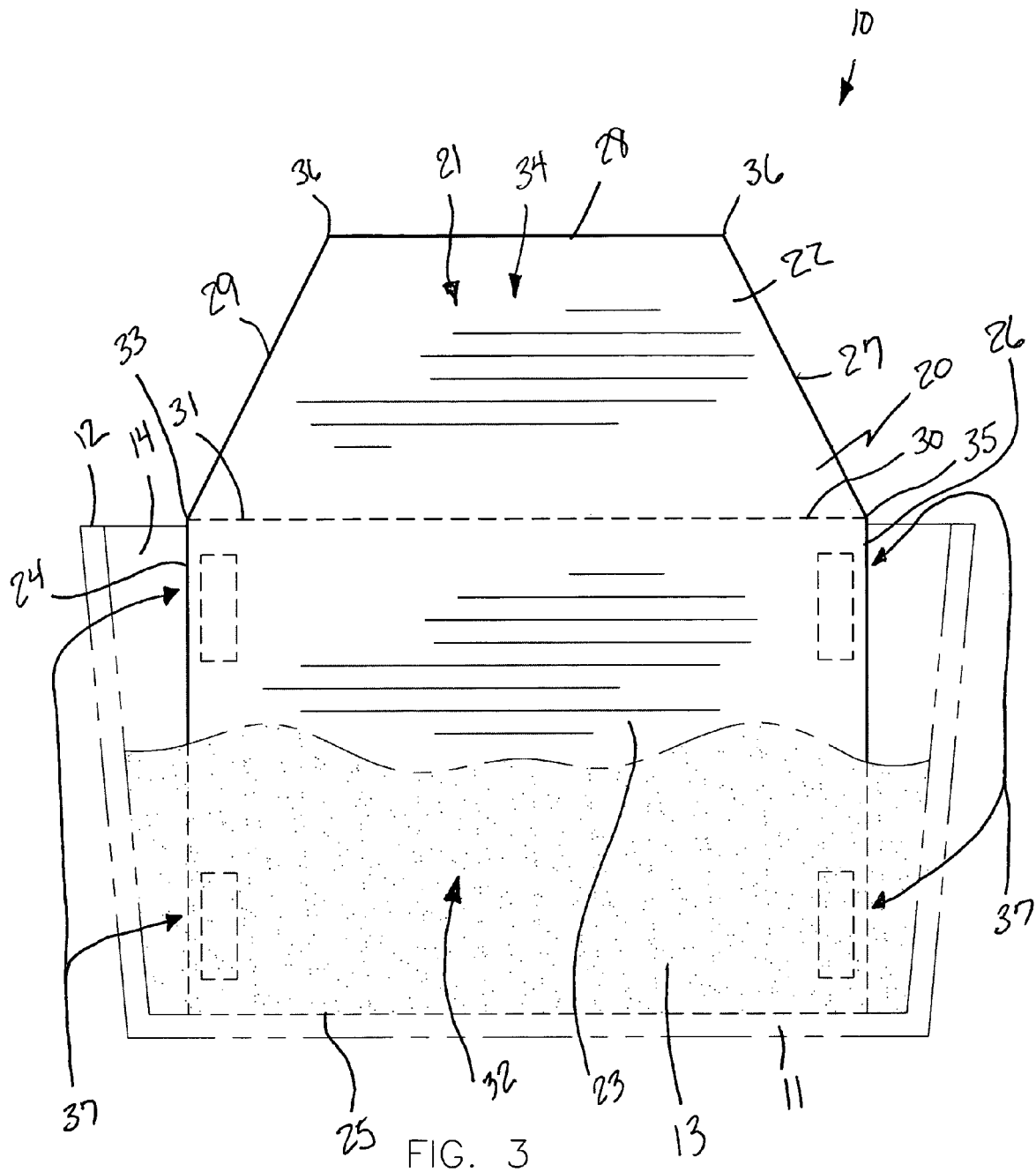
FIG. 3 is a cross sectional view of the apparatus shown in FIG. 1, taken along line 3-3, with hidden lines showing the adhesive layers.
Figure 5:
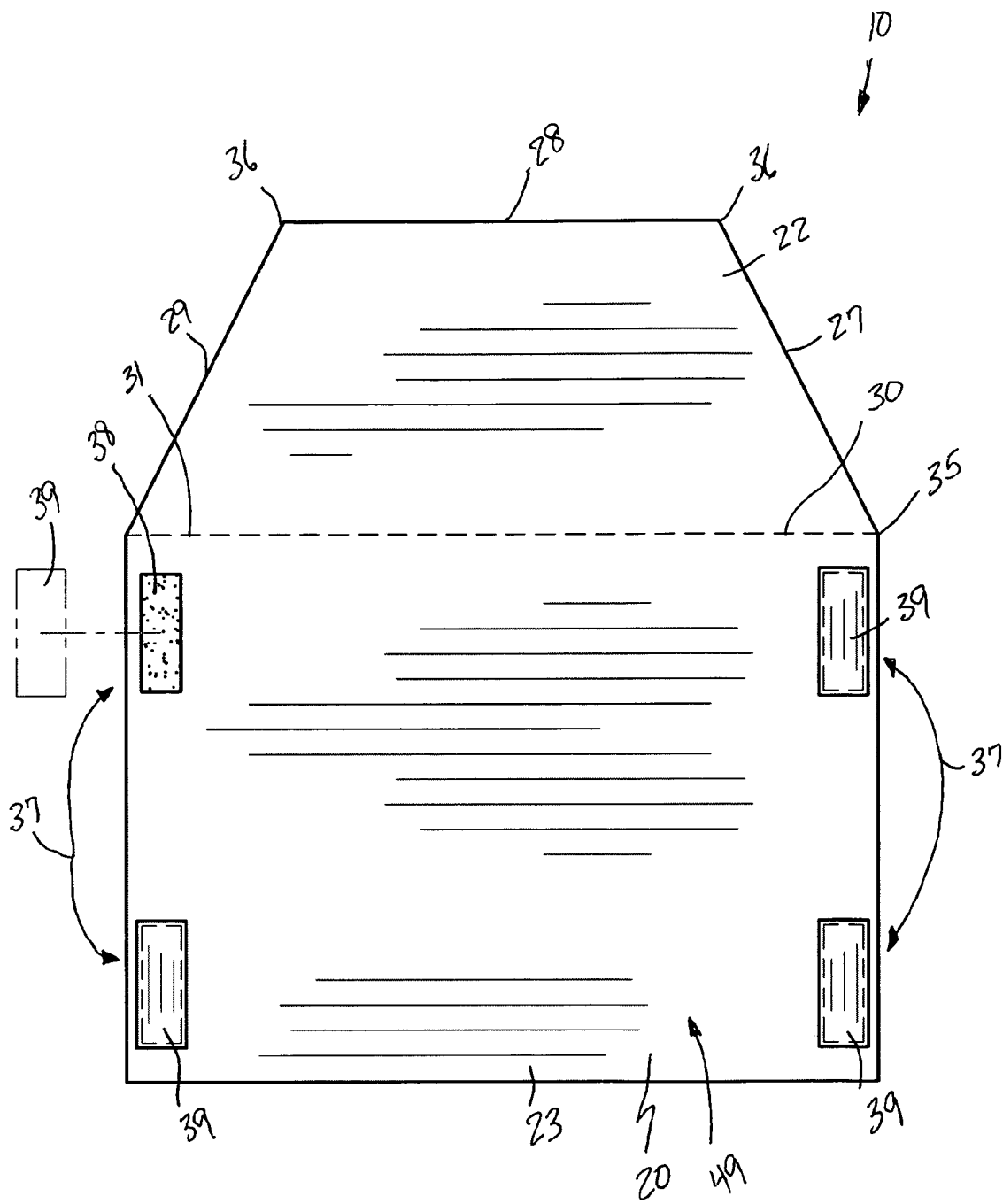
FIG. 5 is a rear elevational view of the apparatus showing one of the protection layers removed from an associated one of the adhesive layers.

Referring to FIGS. 1, 3 and 5, the body 20 further includes a bend line indentation 30 advantageously extending along the fulcrum axis and thereby defining a line of weakness 31 about which the uppermost section 22 is pivotal, which is critical such that the uppermost section 22 is offset downwardly towards the bottom section 23 and towards an interior 32 of the litter container 11. Such a line of weakness 31 defines a common shared edge of the bottom section 23 and the uppermost section 22 respectively. The line of weakness 31 linearly extends from a connection point 33 of the sixth 29 and the first 24 edges and advantageously spans across a face 34 of the body 20 and terminates at a connection point 35 of the fourth 27 and the third 26 edges respectively, which is crucial such that the line of weakness 31 runs parallel to the fifth edge 28 and the second edge 25 respectively.

Again referring to FIGS. 1, 3 and 5, the line of weakness 31 has a longitudinal length equal to a longitudinal length of the second edge 25, and a longitudinal length greater than a longitudinal length of the fifth edge 28. The fourth and sixth edges 27, 29 advantageously converge upwardly and away from the line of weakness 31 and terminate at opposed ends 36 of the fifth edge 28, which is vital such that the fifth edge 28 has a longitudinal length less than a longitudinal length of the second edge 25.

Again referring to FIGS. 1, 2, 3 and 5, the uppermost section 22 is disposed above a top edge 12 of the litter container 11, which is important for preventing fluids and litter from being discharged over the top edge 12 of the litter container 11. The bottom section 23 is partially submerged beneath the litter 13 housed within the litter container 11. The litter 13 remains positioned forwardly of the bottom section 23, which is essential such that the bottom section 23 absorbs fluids disposed above and below the litter 13.

Figure 2:
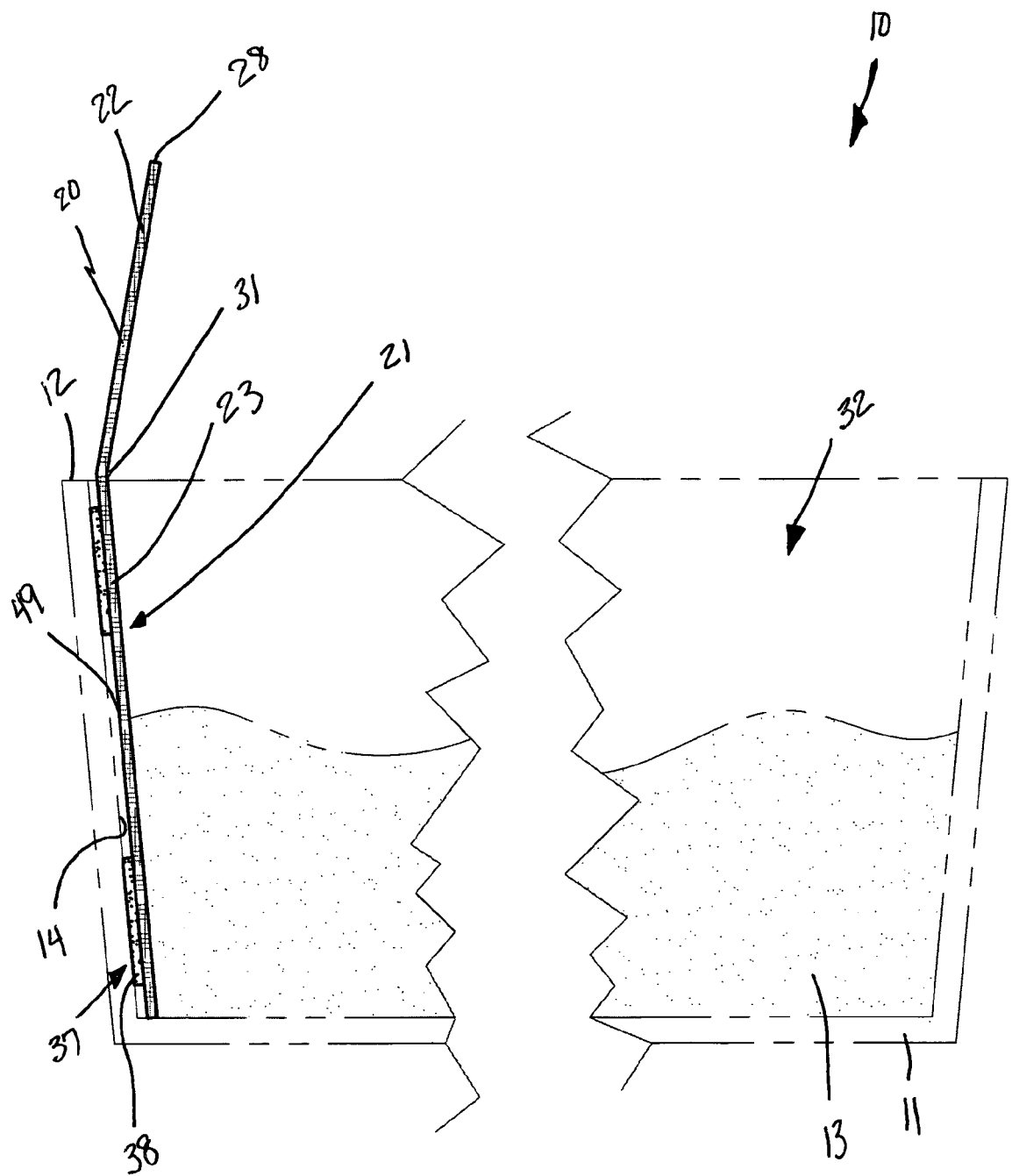
FIG. 2 is a broken cross sectional view of the apparatus shown in FIG. 1, taken along line 2-2.

Referring to FIGS. 2, 3 and 5, the apparatus 10 further includes a mechanism 37 for removably affixing the bottom section 23 of the body 20 to an inner surface 14 of the litter container 11, which is critical such that the body 20 provides a barrier for advantageously prohibiting discharge of fluids and litter 13 from the litter container 11. The removable affixing mechanism 37 includes a plurality of coextensively shaped adhesive layers 38 directly mated with a rear surface 49 of the bottom section 23, without the use of intervening elements.

Such adhesive layers 38 have rectilinear shapes contiguously extending parallel to the first and third edges 24, 26, which is crucial such that the body 20 remains statically adhered to the inner surface 14 and thereby advantageously maintains the body 20 at an upright position defined parallel to the inner surface 14 during operating conditions. Of course, such adhesive layers 38 can be produced in a variety of shapes and sizes, as is obvious to a person of ordinary skill in the art. Elongated protection layers 39 are removably positioned over the adhesive layers 38, which is vital such that the protective layers 39 protect the adhesive layers 38 from prematurely engaging fluids and debris prior to conjoining the body 20 against the inner surface 14 of the litter container 11.

Figure 4:
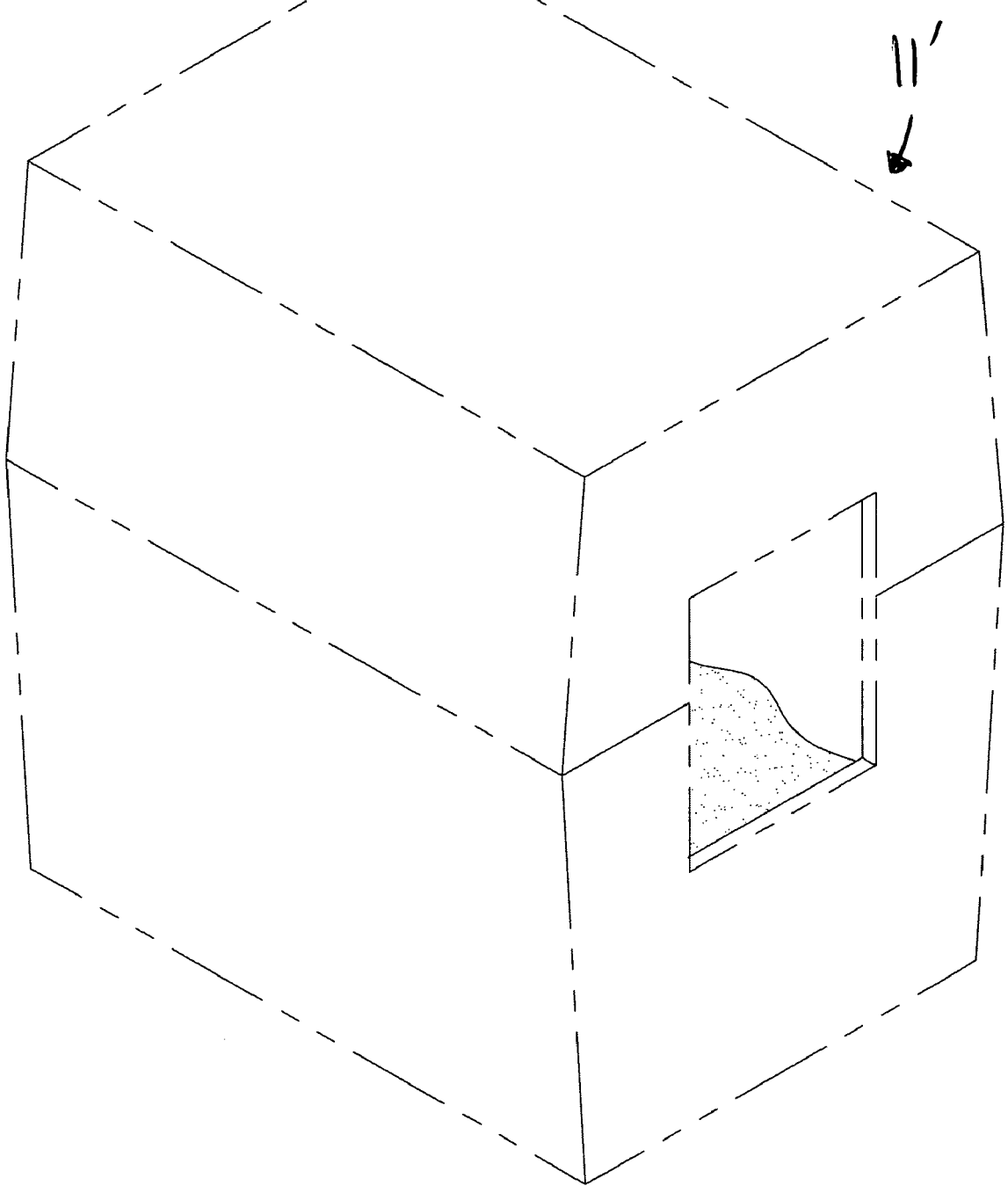
FIG. 4 is a perspective view showing an example of a kitty litter container having a top lid attached to a bottom base which can be used in combination with the shield of present invention.

Referring to FIG. 4, a perspective view is shown of an example of a kitty litter container 11' having a top lid attached to a bottom base which can be used in combination with the shield of present invention. Such an embodiment may include a combination of a kitty litter container 11' and apparatus 10 wherein the apparatus 10 is hidden within the enclosed litter container 11' for aesthetic reasons.

The ability to easily and removably affix the apparatus 10 to a wide variety of differently shaped litter containers 11, as well as the ability to pivot the uppermost section 22 towards the interior 32 of a litter container 11 during operating conditions, provides the unexpected benefit of allowing a user to utilize the apparatus 10 with differently sized litter containers 11 that are both lidded and non-lidded, thus overcoming prior art shortcomings.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A disposable sanitary shield employed with kitty litter containers for absorbing and deflecting cat spray into kitty litter, said sanitary shield comprising:

a unitary and single body formed from liquid absorbing material, said body having an uppermost section and a bottom section monolithically formed therewith wherein said uppermost section is selectively pivotal along a fulcrum axis transversely defined to a longitudinal axis of said body, said uppermost section having a surface area less than a surface area of said bottom section, said body further having first, second and third edges defining an outer periphery of said bottom section, said body further having fourth, fifth and sixth edges defining an outer periphery of said uppermost section, said body further including a bend line indentation extending along said fulcrum axis and thereby defining a line of weakness about which said uppermost section is pivotal such that said uppermost section is offset downwardly towards said bottom section and towards an interior of the kitty litter container, said uppermost section being disposed above a top edge of the kitty litter container for effectively preventing fluids and kitty litter from being discharged over the top edge of the kitty litter container;

means for removably affixing said bottom section of said body to an inner surface of the kitty litter container such that said body provides a barrier for prohibiting discharge of fluids and kitty litter from the litter container;

wherein said removable affixing means comprises a plurality of coextensively shaped adhesive layers directly mated with a rear surface of said bottom section, said adhesive layers having rectilinear shapes contiguously extending parallel to said first and third edges such that said body remains statically adhered to the inner surface and thereby maintains said body at an upright position defined parallel to the inner surface during operating conditions; and elongated protection layers removably positioned over said adhesive layers wherein said protective layers protect said adhesive layers from prematurely engaging fluids and debris prior to conjoining said body against the inner surface of the litter container;

wherein said fourth and sixth edges converge upwardly and away from said line of weakness and terminate at opposed ends of said fifth edge such that said fifth edge has a longitudinal length less than a longitudinal length of said second edge.

2. The sanitary shield of claim 1, wherein said line of weakness defines a common shared edge of said bottom section and said uppermost section respectively.

3. The sanitary shield of claim 1, wherein said line of weakness linearly extends from a connection point of said sixth and said first edges and spans across a face of said body and terminates at a connection point of said fourth and said third edges respectively such that said line of weakness runs parallel to said fifth edge and said second edge respectively, said line of weakness having a longitudinal length equal to a longitudinal length of said second edge, said line of weakness having a longitudinal length greater than a longitudinal length of said fifth edge.

4. The sanitary shield of claim 1, wherein said body is formed from cardboard such that fluids effectively penetrate a surface thereof and become permanently impregnated therein.

5. A disposable sanitary shield employed with kitty litter containers for absorbing and deflecting cat spray into kitty litter, said sanitary shield comprising:

a unitary and single body formed from liquid absorbing material, said body having an uppermost section and a bottom section monolithically formed therewith wherein said uppermost section is selectively pivotal along a fulcrum axis transversely defined to a longitudinal axis of said body, said uppermost section having a surface area less than a surface area of said bottom section, said body further having first, second and third edges defining an outer periphery of said bottom section, said body further having fourth, fifth and sixth edges defining an outer periphery of said uppermost section, said body further including a bend line indentation extending along said fulcrum axis and thereby defining a line of weakness about which said uppermost section is pivotal such that said uppermost section is offset downwardly towards said bottom section and towards an interior of the kitty litter container, said uppermost section being disposed above a top edge of the kitty litter container for effectively preventing fluids and kitty litter from being discharged over the top edge of the kitty litter container, wherein said bottom section is partially submerged beneath kitty litter housed within the kitty litter container;

means for removably affixing said bottom section of said body to an inner surface of the kitty litter container such that said body provides a barrier for prohibiting discharge of fluids and kitty litter from the kitty litter container;

wherein said removable affixing means comprises:

a plurality of coextensively shaped adhesive layers directly mated with a rear surface of said bottom section, said adhesive layers having rectilinear shapes contiguously extending parallel to said first and third edges such that said body remains statically adhered to the inner surface and thereby maintains said body at an upright position defined parallel to the inner surface during operating conditions; and elongated protection layers removably positioned over said adhesive layers wherein said protective layers protect said adhesive layers from prematurely engaging fluids and debris prior to conjoining said body against the inner surface of the litter container;

wherein said line of weakness linearly extends from a connection point of said sixth and said first edges and spans across a face of said body and terminates at a connection point of said fourth and said third edges respectively such that said line of weakness runs parallel to said fifth edge and said second edge respectively, said line of weakness having a longitudinal length equal to a longitudinal length of said second edge, said line of weakness having a longitudinal length greater than a longitudinal length of said fifth edge.

6. The sanitary shield of claim 5, wherein said fourth and sixth edges converge upwardly and away from said line of weakness and terminate at opposed ends of said fifth edge such that said fifth edge has a longitudinal length less than a longitudinal length of said second edge.

7. The sanitary shield of claim 5, wherein said line of weakness defines a common shared edge of said bottom section and said uppermost section respectively.

8. The sanitary shield of claim 5, wherein said body is formed from cardboard such that fluids effectively penetrate a surface thereof and become permanently impregnated therein.

9. A disposable sanitary shield employed with kitty litter containers for absorbing and deflecting cat spray into kitty litter, said sanitary shield comprising:

a unitary and single body formed from liquid absorbing material, said body having an uppermost section and a bottom section monolithically formed therewith wherein said uppermost section is selectively pivotal along a fulcrum axis transversely defined to a longitudinal axis of said body, said uppermost section having a surface area less than a surface area of said bottom section, said body further having first, second and third edges defining an outer periphery of said bottom section, said body further having fourth, fifth and sixth edges defining an outer periphery of said uppermost section, said body further including a bend line indentation extending along said fulcrum axis and thereby defining a line of weakness about which said uppermost section is pivotal such that said uppermost section is offset downwardly towards said bottom section and towards an interior of the litter container, said uppermost section being disposed above a top edge of the litter container for effectively preventing fluids and litter from being discharged over the top edge of the kitty litter container, wherein said bottom section is partially submerged beneath kitty litter housed within the kitty litter container, wherein kitty litter remains positioned forwardly of said bottom section such that the bottom section effectively absorbs fluids disposed above and below kitty litter;

means for removably affixing said bottom section of said body to an inner surface of the kitty litter container such that said body provides a barrier for prohibiting discharge of fluids and kitty litter from the kitty litter container;

wherein said removable affixing means comprises:

a plurality of coextensively shaped adhesive layers directly mated with a rear surface of said bottom section, said adhesive layers having rectilinear shapes contiguously extending parallel to said first and third edges such that said body remains statically adhered to the inner surface and thereby maintains said body at an upright position defined parallel to the inner surface during operating conditions; and elongated protection layers removably positioned over said adhesive layers wherein said protective layers protect said adhesive layers from prematurely engaging fluids and debris prior to conjoining said body against the inner surface of the litter container;

wherein said line of weakness linearly extends from a connection point of said sixth and said first edges and spans across a face of said body and terminates at a connection point of said fourth and said third edges respectively such that said line of weakness runs parallel to said fifth edge and said second edge respectively, said line of weakness having a longitudinal length equal to a longitudinal length of said second edge, said line of weakness having a longitudinal length greater than a longitudinal length of said fifth edge.

10. The sanitary shield of claim 9, wherein said fourth and sixth edges converge upwardly and away from said line of weakness and terminate at opposed ends of said fifth edge such that said fifth edge has a longitudinal length less than a longitudinal length of said second edge.

11. The sanitary shield of claim 9, wherein said line of weakness defines a common shared edge of said bottom section and said uppermost section respectively.

12. The sanitary shield of claim 9, wherein said body is formed from cardboard such that fluids effectively penetrate a surface thereof and become permanently impregnated therein.

* * * * *